(12) United States Patent
Gupta et al.

(10) Patent No.: US 11,140,075 B1
(45) Date of Patent: Oct. 5, 2021

(54) NETWORK TRAFFIC STEERING AMONG CPU CORES USING FORWARDING PATH ELEMENTS

(71) Applicant: Juniper Networks, Inc., Sunnyvale, CA (US)

(72) Inventors: Peyush Gupta, Bangalore (IN); Dipankar Barman, Bangalore (IN); Shreelan Savyasachi Panikkassery, Bangalore (IN); Bharat Dhaker, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/818,819

(22) Filed: Mar. 13, 2020

(51) Int. Cl.
*H04L 12/721* (2013.01)
*H04L 29/06* (2006.01)
*H04L 12/931* (2013.01)

(52) U.S. Cl.
CPC .............. *H04L 45/38* (2013.01); *H04L 49/70* (2013.01); *H04L 63/164* (2013.01)

(58) Field of Classification Search
None
See application file for complete search history.

(56) References Cited

U.S. PATENT DOCUMENTS

| 8,806,058 B1 | 8/2014 | Mackie et al. |
| 9,356,866 B1 | 5/2016 | Sivaramakrishnan et al. |
| 2019/0132297 A1* | 5/2019 | Ammanur ............. H04L 9/0643 |

FOREIGN PATENT DOCUMENTS

| CN | 201742437 U | * | 2/2011 |
| CN | 109688069 A | * | 4/2019 |
| CN | 111262792 A | * | 6/2020 |
| EP | 3611883 A1 | | 2/2020 |

OTHER PUBLICATIONS

Extended Search Report from counterpart European Application No. 20178062.4, dated Nov. 2, 2020, 9 pp.

* cited by examiner

*Primary Examiner* — Jeffrey R Swearingen
(74) *Attorney, Agent, or Firm* — Shumaker & Sieffert, P.A.

(57) ABSTRACT

In general, the disclosure describes techniques for programming a forwarding plane of a network device to cause the forwarding plane to load balance or otherwise direct packet flows to particular central processing unit (CPU) cores among a plurality of CPU cores. For example, a network device includes a control unit comprising processing circuitry in communication with a memory, wherein the processing circuitry is configured to execute one or more processes. Additionally, the network device includes a forwarding unit comprising an interface card, a packet processor, and a forwarding unit memory. The one or more processes of the control unit are configured for execution by the processing circuitry to configure the forwarding unit memory of the forwarding unit with one or more forwarding path elements, where the one or more forwarding path elements map a packet flow to a CPU core of the plurality of CPU cores for processing.

20 Claims, 5 Drawing Sheets

NETWORK TRAFFIC STEERING AMONG CPU CORES USING FORWARDING PATH ELEMENTS

TECHNICAL FIELD

The disclosure relates to computer networks and, more specifically, to forwarding packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop device to which to forward the packet in accordance with the routing information.

Routers may include one or more packet processors interconnected by an internal switch fabric. Packet processors exchange data with other external devices via interface cards. The switch fabric provides an internal interconnect mechanism for forwarding data within the router between the packet processors for ultimate transmission over a network. In some examples, a router or switching device may employ a distributed, multi-stage switch fabric architecture, in which network packets traverse multiple stages of the switch fabric located in distributed packet processors of the router to travel from an ingress point of the switch fabric to an egress point of the switch fabric.

SUMMARY

In general, the disclosure describes techniques for programming a forwarding plane of a network device with routes and forwarding nexthops that include metadata to cause the forwarding plane to load balance or otherwise direct packet flows to particular central processing unit (CPU) cores among a plurality of CPU cores. In some examples, a network device may include a set of one or more CPUs, each CPU of the set of CPUs including a set of one or more CPU cores. The network device may receive and forward network traffic (e.g., packets) that corresponds to any one or more of a set of services. The network device may use the plurality of CPU cores across the set of CPUs to process the network traffic. In some examples, the network device may route a packet to a particular CPU or CPU core based on one or more applications and/or services (e.g., messaging applications, email applications, video streaming applications, Internet Protocol Security (IPsec), and Carrier Grade Network Address Translation (CG-NAT) services) associated with the packet. In some examples, the packet may include a packet header which identifies one or more applications and/or services associated with the packet.

IPsec represents a communication protocol which allows an encryption and a decryption of one or more data packets for transmission between two or more devices within a network. For example, a first network device may process one or more packets associated with an IPsec "session" between the first network device and a second network device. In some examples, processing the one or more packets includes encrypting one or more packets for forwarding to the second network device and decrypting one or more packets received from the second network device, however this is not required. The first network device may, in some cases, act as an intermediary device to facilitate an IPsec session between two devices. The first network device may route packets associated with an IPsec session to at least one of a plurality of CPU cores for processing.

A network device may include a control plane for controlling one or more functions of the network device, a forwarding plane for receiving and forwarding network traffic, and a service plane for processing network traffic in order to perform one or more services. The control plane may also apply services in some cases. In some examples, the forwarding plane includes a forwarding path having one or more forwarding path elements (e.g., forwarding nexthops), where the one or more forwarding path elements are configured to route incoming packets through the forwarding path and through the service plane, in some examples. Additional description of forwarding nexthops and other forwarding path structures is found in U.S. Pat. No. 8,806,058, issued Aug. 12, 2014, which is incorporated by reference herein in its entirety. The service plane may include a set of service cards, each service card of the set of service cards including a CPU having a set of CPU cores. The control unit may configure the forwarding path to route the packet to one of the set of service cards in the service plane, and route the packet to one of the CPU cores in the respective service card for processing.

The techniques described herein provide one or more technical improvements having at least one practical application. For example, it may be beneficial for the network device to route each packet associated with a particular application and/or service to the same CPU core for processing. Additionally, it may be beneficial for the control plane of the network device to program the forwarding plane of the network device to more efficiently distribute a plurality of packets across the plurality of CPU cores of the network device as compared with techniques in which the control plane does not program the forwarding plane in such a manner. In some examples, the control plane may program the forwarding plane such that the forwarding plane routes each packet associated with an IPsec session to the same CPU core or set of CPU cores. In some examples, the control plane may program the forwarding plane such that the forwarding plane routes each packet associated with a service and/or and application to the same CPU core or set of CPU cores.

In some examples, a network device includes a control unit including processing circuitry in communication with a memory, where the processing circuitry is configured to execute one or more processes; and a forwarding unit including an interface card, a packet processor, and a forwarding unit memory, where the one or more processes of the control unit are configured to configure the forwarding unit memory of the forwarding unit with one or more forwarding path elements, where the one or more forwarding path elements map a packet flow to a central processing unit (CPU) core of a plurality of CPU cores for processing, where the forwarding unit is configured to receive, via the interface card, a packet of the packet flow, and where the packet processor of the forwarding unit is configured to execute the one or more forwarding path elements in the forwarding unit memory to steer the packet to the CPU core.

In some examples, a method includes executing, by processing circuitry of a control unit, one or more processes, where the processing circuitry is in communication with a memory; configuring, by the one or more processes of the control unit, a forwarding unit memory of a forwarding unit with one or more forwarding path elements, where the forwarding unit includes an interface card, a packet processor, and the forwarding unit memory, and where the one or more forwarding path elements map a packet flow to a central processing unit (CPU) core of a plurality of CPU cores for processing; receiving, by the forwarding unit via the interface card, a packet of the packet flow; and executing, by the packet processor, the one or more forwarding path elements in the forwarding unit memory to steer the packet to the CPU core.

In some examples, a non-transitory computer-readable medium includes instructions for causing one or more programmable processors of a network device to: execute one or more processes of a control plane; configure a forwarding unit memory of a forwarding unit with one or more forwarding path elements, where the forwarding unit includes an interface card, a packet processor, and the forwarding unit memory, and where the forwarding path elements map a packet flow to a central processing unit (CPU) core of a plurality of CPU cores; receive a packet of the packet flow; and execute the one or more forwarding path elements in the forwarding unit memory to steer the packet to the CPU core for processing by the CPU core.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters refer to like elements throughout the text and figures.

DETAILED DESCRIPTION

Figure 1:
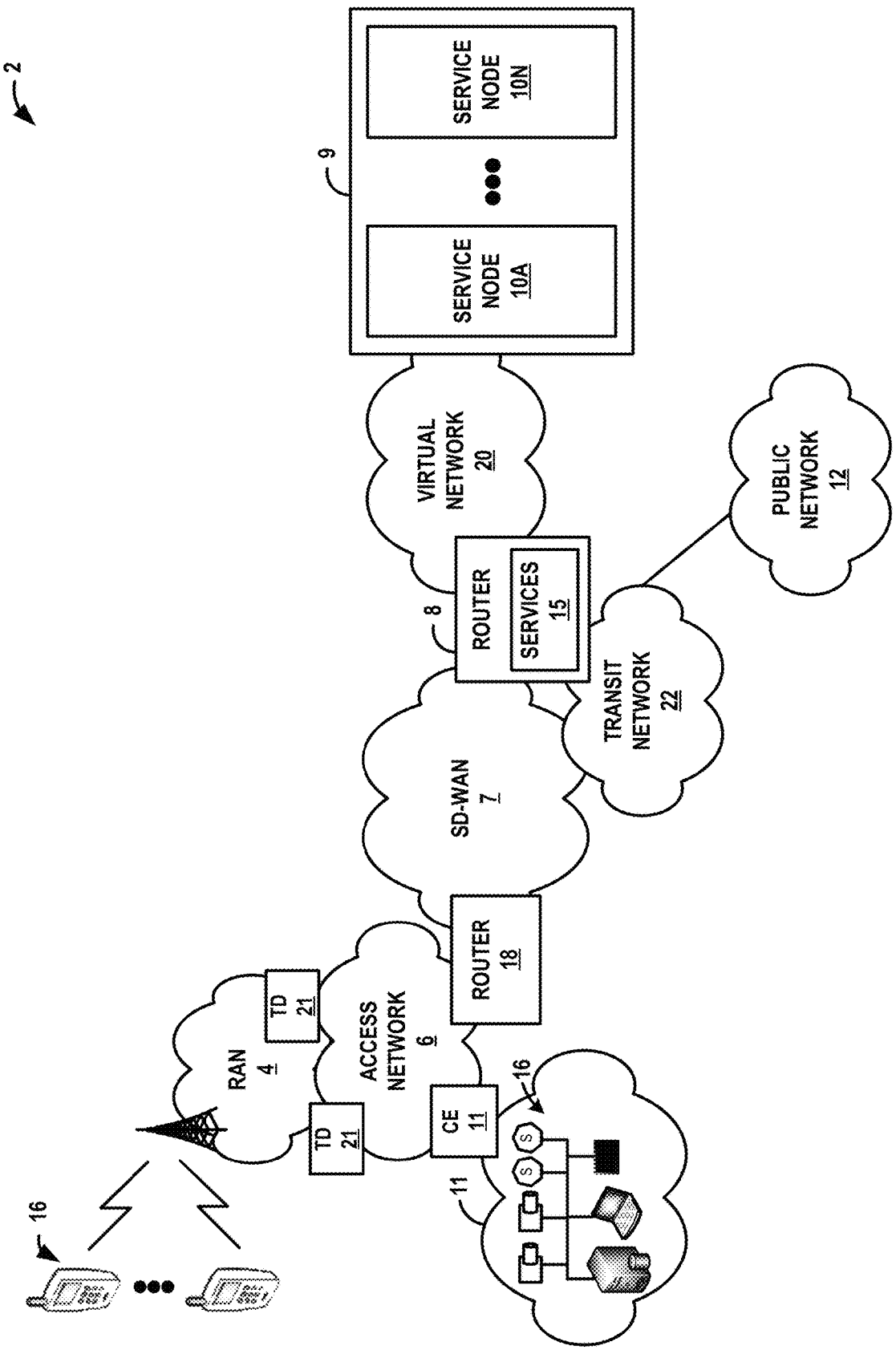
FIG. 1 is a block diagram illustrating an example network system including a router for load-balancing network traffic across a plurality of Central Processing Unit (CPU) cores, in accordance with one or more techniques of this disclosure.

FIG. 1 is a block diagram illustrating an example network system 2 including a router 8 for load-balancing network traffic across a plurality of Central Processing Unit (CPU) cores, in accordance with one or more techniques of this disclosure. Router 8 may include, in some examples, a control plane, a forwarding plane and a service plane. The example network system 2 of FIG. 1 provides packet-based network services to subscriber devices 16. That is, network system 2 provides authentication and establishment of network access for subscriber devices 16 such that a subscriber device may begin exchanging data packets with public network 12, which may be an internal or external packet-based network such as the Internet.

In the example of FIG. 1, network system 2 includes access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or data center 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may include mobile devices that access the data services of Network system 2 via a radio access network (RAN) 6. Example mobile subscriber devices include mobile telephones, laptop or desktop computers having, e.g., a cellular wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more subscriber devices 16 for transport to/from SD-WAN 7 of the service provider. Access network 6 includes network nodes that execute communication protocols to transport control and user data to facilitate communication between subscriber devices 16 and router 8.

Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Router 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10A-10N (collectively, "service nodes 10") via virtual network 20, and router 8 may forward packets to public network 12 via transit network 22.

In examples of network system 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network system 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network system 2 typically offers services to subscribers associated with devices, e.g., subscriber devices 16, that access Network system 2. Services offered may include, for example, traditional Internet access, VoIP, video and multimedia services, and security services such as Internet Protocol Security (IPsec). As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as Router 18 or router 8. In turn, router 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, Router 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on a set service cards installed within router 8. In some examples, service cards may be referred to herein as "field-replaceable units (FRUs)." Each service card of the set of service cards installed within router 8 may include a Central Processing Unit (CPU) including a set of CPU cores in the service plane for deep packet processing of network traffic. In some examples, the set of service cards may be a part of a "service plane" of router 8. Router 8 may also include a control plane and a forwarding plane. The control plane may include one or more virtual machines (VMs) executed by processors, where the one or more VMs are configured to program the forwarding plane to route network traffic such as packets to one or more CPU cores of the service plane for processing. Subsequently, the forwarding plane of router 8 may forward the network traffic to a respective destination device (e.g., one of subscriber devices 16).

Network system 2 may include a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after router 18 has authenticated and established access sessions for the subscribers, router 18 or router 8 may direct packet flows for the subscribers along the appropriate service tunnels, thereby causing data center 9 to apply the requisite ordered services for the given subscriber.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may include a scalable cluster of general computing devices, such as x86 processor-based servers. As another example, service nodes 10 may include a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

In accordance with techniques described herein, one or more processes executing on a control plane of router 8 may generate data including instructions for configuring one or more forwarding path elements of a forwarding path which represents a part of the forwarding plane of router 8. In some examples, the processes may generate the data for configuring the one or more forwarding path elements based on user input. In some examples, the processes may automatically generate the data for configuring the one or more forwarding path elements based on resource data (e.g., current CPU availability and/or current CPU usage) within router 8. Subsequently, the control plane processes of router 8 may configure the one or more forwarding path elements based on the instructions in order to allow the forwarding path to steer, based on the packet header, the packet to a particular CPU core of a plurality of CPU cores for processing. Additionally, in some cases, the control plane processes may save, to a memory, a current configuration of the plurality of forwarding path elements after the processing circuitry configures the one or more forwarding path elements based on the instructions.

In some examples, the plurality of forwarding path elements of router 8 include a first nexthop element and a second nexthop element, and router 8 is configured to identify, in the instructions for configuring the one or more forwarding path elements, an indication of one or more services corresponding to each service card of a set of service cards located in a service plane of router 8. Router 8 may configure the first nexthop element to forward a packet to a service card of the set of service cards based on a service associated with the packet, which is identified in a packet header. In this way, when the control plane of router 8 configures the first nexthop element, the forwarding unit may read the packet header of the packet to identify a service, and the first nexthop element may forward the packet to a service card of the set of service cards based on the service identified by the packet header.

Each service card of the set of service cards may include a set of CPU cores, and router 8 may be configured to steer network traffic to specific CPU cores based on services and/or applications associated with the respective network traffic. Additionally, the control plane of router 8 may program the second nexthop element to steer a packet to a particular CPU core of the set of CPU cores based on one or more services and/or applications identified by the respective packet header. In this way, the control plane of router 8 may configure the forwarding path of router 8 in order designate one or more CPU cores of the plurality of CPU cores for processing packets associated with each respective service of a set of services. In some examples, the control plane may configure the first nexthop element and the second nexthop element to steer packets associated with a first IPsec session to a first CPU core, steer packets associated with a second IPsec session to a second CPU core, steer packets associated with a third IPsec session to a third CPU core, and so on. IPsec represents a communication protocol which allows an encryption and a decryption of one or more data packets for transmission between two or more devices within a network by creating a secure tunnel between two or more endpoints. It may be beneficial for one CPU core to process all packets associated with one IPsec session in order to improve an efficiency as compared with techniques in which more than one CPU core is used to process packets associated with one IPsec session. The packet header may identify an IPsec session associated with the packet.

Figure 2:
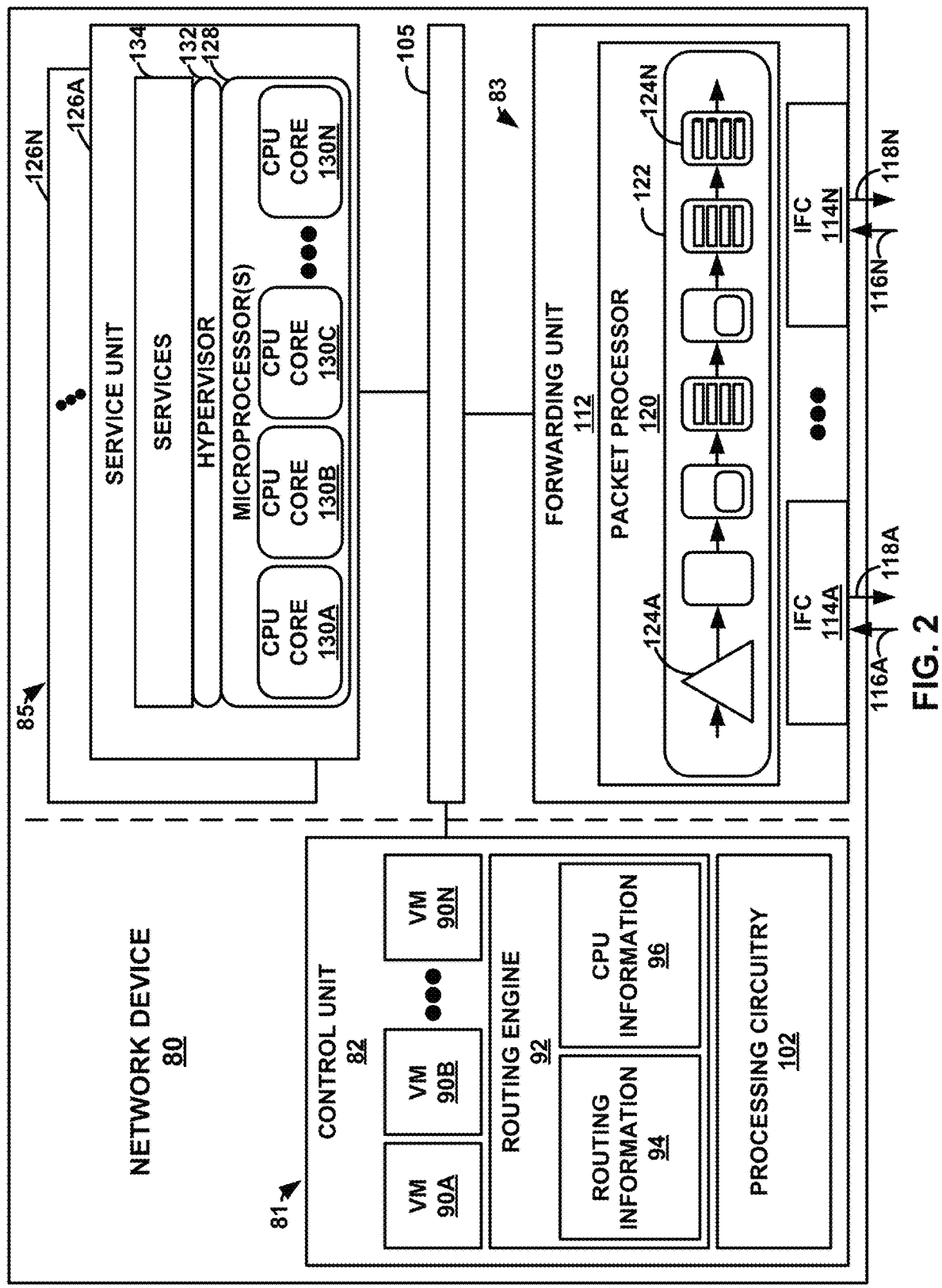
FIG. 2 is a block diagram illustrating an example network device configured to program one or more forwarding path elements to route a packet to one or more CPU cores of a plurality of CPU cores, in accordance with the techniques of this disclosure.

FIG. 2 is a block diagram illustrating an example network device 80 configured to program one or more forwarding path elements to route a packet to one or more CPU cores of a plurality of CPU cores 130A-130N, in accordance with the techniques of this disclosure. While network device 80 may be any network device configured to perform the techniques described herein, network device 80 may be an example of Router 8 of FIG. 1 or Router 18 of FIG. 1. Network device 80 may be described herein within the context of Network system 2 of FIG. 1. Moreover, while described with respect to a particular network device, e.g., a router, the techniques may be implemented by any network device, such as a client device, a Layer 3 (L3) or L2/L3 switch, or server.

In this example, network device 80 is divided into three logical or physical "planes" to include a control plane 81 that performs control operations for the device, a forwarding plane 83 for forwarding transit network traffic and a service plane 85 for application of one or more network services 134 to transit packet flows that are forwarded by the router. That is, network device 80 implements three separate functionalities (e.g., the routing/control functionalities, forwarding data functionalities, and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 85, and forwarding plane 83 to deliver data units and control messages among the units. Switch fabric 105 may represent an internal switch fabric or cross-bar, bus, or link.

Control plane 81 includes control unit 82 having processing circuitry 102, which executes device management services, subscriber authentication and control plane routing functionality of network device 80. Additionally, control unit 82 includes VMs 90A-90N (collectively, "VMs 90") and routing engine 92 which are executed by processing circuitry 102. Each of VMs 90 may be an example of a control plane process. Routing engine 92 includes routing information 94 and CPU information 96. Forwarding plane 83 includes forwarding unit 112 which receives and outputs network traffic (e.g., packets) via interface cards 114A-114N (collectively, "IFCs 114"). For example, IFCs 114 receive network traffic via inbound links 116A-116N (collectively, "inbound links 116") and output network traffic via outbound links 118A-118N (collectively, "outbound links 118"). Additionally, forwarding unit 112 includes packet processor 120 and forwarding path 122. Forwarding path 122 includes forwarding path elements 124A-124N (collectively, "forwarding path elements 124"). Service plane 85 includes service units 126A-126N (collectively, "service units 126"). In some examples, a service unit (e.g., service unit 126A) represents a service card that may be added to and/or removed from network device 80. In some examples, service units 126 may be referred to herein as "field-replaceable units (FRUs)." Service unit 126A includes, for example, microprocessor 128 which is configured to execute hypervisor 132 and services 134.

Although illustrated and described herein primarily with respect to insertable service cards, the techniques may apply to directing network packets to other types of service units, including such as real or virtual servers. Service nodes 10 of FIG. 1 that are external to router 8 and router 18 may represent examples of service units, for instance.

In the example of FIG. 2, processing circuitry 102 which executes device management services, subscriber authentication and control plane routing functionality of network device 80. Processing circuitry 102 may include, for example, microprocessors, digital signal processors (DSPs), application specific integrated circuits (ASICs), field programmable gate array (FPGAs), or equivalent discrete or integrated logic circuitry, or a combination of any of the foregoing devices or circuitry. Accordingly, the terms "processor" or "controller," as used herein, may refer to any one or more of the foregoing structures or any other structure operable to perform techniques described herein. Executables, such as VMs 90A-90N (collectively, "VMs 90") and routing engine 92 including routing information 94 and CPU information 96, may be operable by processing circuitry 102 to perform various actions, operations, or functions of network device 80. For example, processing circuitry 102 of network device 80 may retrieve and execute instructions stored by various data stores that cause processing circuitry 102 to perform the operations of VMs 90 and routing engine 92.

One or more storage components within network device 80 may store information for processing during operation of network device 80 (e.g., network device 80 may store data accessed by VMs 90, routing engine 92, and services 134 during execution at network device 80). In some examples, the storage component is a temporary memory, meaning that a primary purpose of the storage component is not long-term storage. Storage components on network device 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with VMs 90, routing engine 92, and services 134. The storage components may include a memory configured to store data or other information associated with VMs 90, routing engine 92, and services 134.

In general, control unit 82 includes a routing engine 92 configured to communicate with a forwarding unit 112 and, in some cases, other forwarding units of network devices not illustrated in FIG. 2. Routing engine 92 may, in some cases, represent control plane management of packet forwarding throughout network device 80. For example, Network device 80 includes interface cards 114A-114N (collectively, "IFCs 114") that receive packets via inbound links and send packets via outbound links. IFCs 114 typically have one or more physical network interface ports. In some examples, after receiving a packet via IFCs 114, network device 80 uses forwarding unit 112 to forward the packet to a next destination based on operations performed by routing engine 92. In this way, routing engine 92 may provide control plane functionality to network device 80. Routing engine 92 may include information corresponding to one or both of service plane 85 and forwarding plane 83. Routing engine 92 may include routing information 94 which indicates a current configuration of one or more forwarding path elements of packet processor 120, for example. Additionally, routing engine 92 includes CPU information 96, which indicates respective current utilizations of one or more CPU cores of CPU cores 130.

Routing engine 92 may provide an operating environment for various protocols (not illustrated in FIG. 2) that execute at different layers of a network stack. Routing engine 92 may be responsible for the maintenance of routing information 94 to reflect the current configuration of packet processor 120. In particular, routing protocols periodically update routing information 94 to accurately reflect the current configuration of Forwarding plane 83 based on metadata generated by network device VMs 90, for example. The protocols may be software processes executing on processing circuitry 102. In this way, routing engine 92 may occupy a group of compute nodes in processing circuitry 102 such that the group of compute nodes are not available to execute VMs such as VMs 90. For example, routing engine 92 may include bridge port extension protocols, such as IEEE 802.1BR. Routing engine 92 may also include network protocols that operate at a network layer of the network stack. In the example of FIG. 2, network protocols may include one or more control and routing protocols such as border gateway protocol (BGP), interior gateway protocol (IGP), label distribution protocol (LDP) and/or resource reservation protocol (RSVP). In some examples, the IGP may include the open shortest path first (OSPF) protocol or the intermediate system-to-intermediate system (IS-IS) protocol. Routing engine 92 also may include one or more daemons that include user-level processes that run network management software, execute routing protocols to communicate with peer routers or switches, maintain and update one or more routing tables, and create one or more forwarding tables for installation to forwarding unit 112, among other functions.

Routing information 94 may include, for example, route data that describes various routes within network device 80 and within network system 2, and corresponding next hop data. For example, routing information 94 may include information indicating a packet destination element of packet processor 120 following a specific nexthop element of packet processor 120, where the destination element depends on a packet header of the packet. Network device 80 updates routing information 94 based on metadata generated by VMs 90 for programming packet processor 120. Based on routing information 94, routing engine 92, executing on processing circuitry 102, may generate forwarding information (not illustrated in FIG. 2) and output the forwarding information to forwarding unit 112 in order to program one or more forwarding path elements 124 of packet processor 120. The forwarding information, in some examples, associates one or more CPU cores pf CPU cores 130 with specific services associated with incoming packets. For example, Routing engine 92 may generate the forwarding information based on metadata generated by VMs 90 and output the forwarding information in order to program packet processor 120 to steer a packet associated with a particular service to one or more CPU cores of CPU cores 130 for processing. In some examples, the processing of the packet by the one or more CPU cores may include full packet encryption and/or full packet decryption. Forwarding unit 112 may identify the service associated with the packet by reading the packet header of the packet.

Forwarding plane 83, in this example includes forwarding unit 112 configured to perform packet forwarding functionality. In the example of network device 80, forwarding plane 83 includes forwarding unit 112 that provides high-speed forwarding of network traffic received by IFCs 114 via inbound links 116 and output via outbound links 118. Forwarding unit 112 may include packet processor 120 which is coupled to IFCs 114. Packet processor 120 may represent one or more packet forwarding engines ("PFEs") including, for example, a dense port concentrator (DPC), modular port concentrator (MPC), flexible physical interface card (PIC) concentrator (FPC), or another line card, for example, that is insertable within a chassis or combination of chassis of network device 80.

In one example, forwarding path 122 arranges forwarding path elements 124 as next hop data that can be chained together as a series of "hops" along an internal packet forwarding path for the network device. In many instances, forwarding path elements 124 perform lookup operations within internal memory of forwarding unit 112, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within forwarding path 122 determines the manner in which a packet is forwarded or otherwise processed by forwarding unit 112 from its input interface on one of IFCs 114 to its output interface on one of IFCs 114.

Service plane 85 of network device 80 includes a plurality of service units 126 that may be, as examples, removable service cards, which are configured to apply network services to packets flowing through forwarding plane 83. Service units 126 may include FRUs in some examples. That is, when forwarding packets, forwarding units 112 may steer packets to service plane 85 for application of one or more network services 134 by service units 126. In this example, each of service units 126 includes a microprocessor configured to execute a hypervisor to provide an operating environment for a plurality of network services. For example, service unit 126 includes microprocessor 128 configured to execute hypervisor 132 to provide an operating environment for network services 134. As examples, service units 126 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 134 may be implemented, for example, as virtual machines or containers executed by hypervisor 132 and microprocessor 128. In some examples, service plane 85 may be configured to execute services 134 more efficiently as compared with forwarding plane 81.

In some examples, forwarding unit 112 of network device 80 is configured to receive one or more packets, each packet of the one or more packets being associated with one or more services. For example, each packet of the one or more packets may be associated with one or more network services 134 executed by microprocessor 128 of service unit 126A. In one example, IFC 114A of forwarding unit 112 may receive a packet via inbound link 116A. Subsequently, the packet may travel through forwarding path 122. In some examples, the packet may include a header. Forwarding unit 112 may read the header of the packet. The header of the packet may include information which indicates a number of details associated with the packet such as, for example, a device which network device 80 receives the packet from, a device which network device 80 is to forward the packet to, and one or more services (e.g., one or more of network services 134 and/or one or more other services not illustrated in FIG. 2) associated with the packet. Forwarding unit may identify the packet header, and process the packet header in order to determine the information indicated by the packet header. In other words, forwarding unit 112 may process the packet header in order to determine the one or more services associated with the packet.

Packet processor 120 processes the packet according to forwarding path elements 124 along forwarding path 122. Forwarding path elements 124 represent a logical flow which forms a set of "paths" for packets being processed according to forwarding path 122. A packet may travel through the paths formed by forwarding path elements 124 based on data included in the header of the packet, in some cases. Control plane 81 (e.g., VMs 90 and/or routing engine 92) may generate forwarding path elements 124 to map the packet based on the packet header. In some examples, forwarding path elements 124 may cause forwarding unit 112 to steer the packet to one or more other components of network device 80 for processing, such as service units 126. For example, in order to apply a service to a packet, a forwarding path element of forwarding path elements 124 may map, based on the packet header of a packet, the packet to a service unit of service units 126 for processing by a CPU core located on the respective service unit.

In accordance with techniques described herein, forwarding path elements 124 map packet flows to respective, particular CPU cores 130 and/or to respective, particular service units 126. For example, one of forwarding path elements 124 may map a first packet flow, corresponding to a first service, to CPU core 130B. As such packet processor 120 processes packets of the first packet flow with the forwarding path element 124 to direct the packets to CPU core 130B for processing. In some examples, the forwarding path elements 124 map packet flows between a source and destination, in the both the uplink and downlink direction, to the same one of CPU cores 130 to facilitate processing by that CPU core 130 of the packet flows in both the uplink and downlink direction.

Control plane 81 generates and downloads, to forwarding unit 112, forwarding path elements 124 that include metadata to map packet flows to particular CPU cores 130 and/or particular service units 126. The metadata may, for instance, parameterize forwarding next hops of forwarding path elements 124 with identifiers for CPU cores 130 and/or service units 126 such that the forwarding path elements 124, when executed, cause packet processor 120 to steer matching packets to a particular CPU core 130. Metadata may include, for instance, link identifier, tunnel (e.g., IPSec) identifier, or n-tuple data for matching to a packet. Metadata may also include, for instance, data identifying a lookup table for determining a service unit, data identifying a lookup table for determining a CPU core, or other data to map matching packets to a particular service unit 126 or CPU core 130.

Forwarding path elements 124 may, in some cases, include a first nexthop including a first steering logic and a second nexthop including a second steering logic. When the packet arrives at the forwarding unit 112, in some cases, packet processor 120 may execute the first steering logic to map the packet to a service unit (e.g., service unit 126A) of service units 126 based on the one or more services associated with the packet. Forwarding unit 1212 may read the packet header to determine the one or more services associated with the packet. In some examples, not every service unit of service units 126 are configured to apply the same set of services as each other service unit of service units 126. In other words, network services 134 may include a set of services that is at least partially different than a set of services associated with at least one other service unit of service units 126. As such, it may be beneficial for forwarding unit 112 to steer the packet to a service unit of service units 126 that is configured to apply one or more services associated with the packet. The first steering logic of the first nexthop element may be configured to identify the one or more services associated with the packet based on the packet header and map the packet to a service unit (e.g., service unit 126A) of service units 126 corresponding to the one or more services. As such, the first steering logic may cause forwarding unit 112 to steer the packet to service unit 126A via switch fabric 105.

As discussed above, service unit 126A may include CPU cores 130. It may be beneficial for the packet associated with a service to be processed using the same CPU cores of CPU cores 130 as other packets associated with the same service. The second steering logic of the second nexthop element may map the packet to a CPU core of CPU cores 130. For example, the second steering logic may map the packet to CPU core 130B for processing the packet. After the packet travels through forwarding path elements 124, forwarding unit 112 may steer the packet to service unit 126A and CPU core 130B may process the packet in order to execute one or more services of network services 134, where CPU core 130B processes the packet apart from control plane 81 and forwarding plane 83. Subsequently, service unit 126A may steer the packet back to forwarding unit 112 and forwarding unit 112 may forward the packet via an outbound link (e.g., outbound link 118A) of outbound links 118.

Control unit 82 may be configured to configure forwarding unit 112 in order to steer packets arriving at inbound links 116 to service units 126 for processing. For example, VMs 90 may be configured to generate at least one of forwarding path elements 124 in order to cause routing engine 92 to output the at least one of forwarding path elements 124 to forwarding unit 112. For example, VMs 90 may generate the at least one of forwarding path elements 124 in order to cause routing engine 92 to output a first nexthop element of forwarding path elements 124 for steering packets to service units 126 based on one or more services based on a respective packet. For example, routing engine 92 may output instructions to associate each service unit of service units 126 with one or more services. Additionally, in some cases, Control unit 82 may be configured to program forwarding unit 112 in order to route packets arriving at inbound links 116 to for processing by one or more specific CPU cores of a specific service unit for processing.

In some examples, each service unit of service units 126 may represent a service card which may be added to network device 80 and/or removed from network device 80. Responsive to a service unit 126 being added to network device 80 or responsive to a service unit 126 being removed from network device 80, control unit 82 may re-program forwarding path elements 124 based on the addition or removal of the respective control unit. For example, if forwarding path elements 124 is currently programmed to cause forwarding unit 112 to route a packet associated with a particular service to service unit 126N, and service unit 126N is subsequently removed from network device 80, control unit 82 may automatically re-configure forwarding path elements 124 in order to route incoming packets associated with the service to another service unit of service units 126 without interrupting any services provided by network device 80. In a similar way, control unit 82 may automatically re-configure forwarding path elements 124 in order to steer incoming packets associated with the service to a specific CPU core or group of CPU cores within another service unit of service units 126.

The network services 134 executed by microprocessor 128 may include, in some examples, IPsec. IPsec is a communication protocol which allows an encryption and a decryption of one or more data packets for transmission between two or more devices (e.g., router 8, service nodes 10, subscriber devices 16, and router 18 of FIG. 1 and network device 80 of FIG. 2) within a network (e.g., network system 2 of FIG. 1). For example, network device 80 device may process one or more packets associated with an IPsec session between a first device and a second device. In order to process a packet associated with the IPsec session, a CPU core, such as CPU core 130B of microprocessor 128 may execute an IPsec service of network services 134. Processing the packet according to the IPsec service may involve encrypting data and/or decrypting data within a payload of the packet for forwarding to a destination device of the first device and the second device, but this is not required. Processing the packet according to the IPsec service may include other actions in addition to or alternatively to decrypting and decrypting.

Control unit 82 may configure forwarding path elements 124 to route packets associated with different IPsec sessions to respective CPU cores. Control unit 82 may configure forwarding path elements 124 to steer packets associated with a first IPsec session to service unit 126A for processing by CPU core 130A, steer packets associated with a second IPsec session to service unit 126A for processing by CPU core 130C, steer packets associated with a third IPsec session to service unit 126A for processing by CPU core 130N, and steer packets associated with a fourth IPsec session to service unit 126N for processing by a CPU core located on service unit 126N, as an example. It may be beneficial for one CPU core to process all packets associated with one IPsec session in order to improve an efficiency as compared with techniques in which more than one CPU core is used to process packets associated with one IPsec session. One CPU core, such as CPU core 130B, may be configured to process packets associated with more than one IPsec session. For example, CPU core 130B may process packets associated with a fifth IPsec session and process packets associated with a sixth IPsec session.

The term "session," "packet flow," "traffic flow," or simply "flow" may refer to a set of packets originating from a particular source device or endpoint and sent to a particular destination device or endpoint. A single flow of packets may be identified by a 5-tuple hash: <source network address, destination network address, source port, destination port, protocol>, for example. This 5-tuple hash generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The 5-tuple hash of a packet may be located in the packet header of packet 196.

Traditional networks and cloud-based networks, such as network system 2, may use information other than a five-tuple hash of a packet to determine a destination of the packet. One or more service models may implement load-balancing solutions in order to apply services to incoming network traffic. One or more techniques described herein may use application identification (e.g., "app-id") load distribution and one or more techniques described herein may use tunnel-based load distribution or session-based load distribution. Additionally, or alternatively, one or more techniques described herein may use some stateless load distribution.

It may be beneficial to increase an efficiency of the use of CPU cores and the use bandwidth available in each service unit of service units 126 by implementing load-balancing, as compared with techniques which do not use load-balancing between CPU cores and service units. As the compute power increases, packet distribution help to achieve optimal usage of compute power and bandwidth available in network system 2.

Network device 80 may implement CPU core load-balancing using route-based next-hops. CPU core load-balancing may be applied to different services (e.g., network services 134) and applications running in network system 2. Route-based next-hops may co-exist with firewall-based next-hops and routes. One or more techniques may use route metadata to decide that network traffic on a particular route (e.g., session) should be steered to a given CPU core or set of CPU cores identified by a CPU core id. Network device 80 may implement a CPU distribution profile such as in Virtual Network Function (VNF) microservices models and containerized microservices models. Network device 80 may support symmetric route-based load balancing for uplink and downlink network traffic.

Figure 3A:
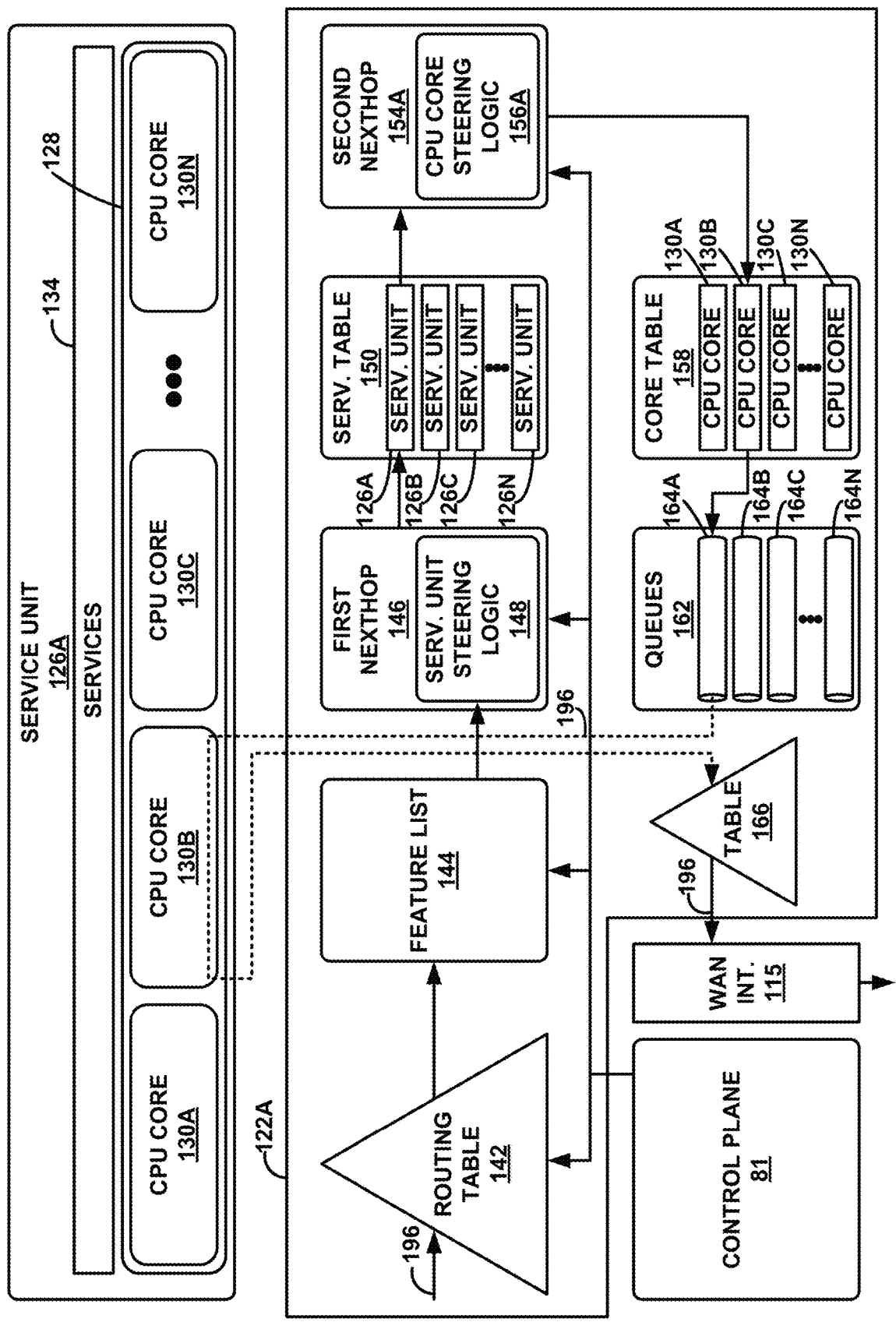
FIG. 3A is a conceptual diagram illustrating an example forwarding path, in accordance with one or more techniques of this disclosure.

FIG. 3A is a conceptual diagram illustrating an example forwarding path 122A, in accordance with one or more techniques of this disclosure. Forwarding path 122A may be an example of forwarding path 122 of FIG. 2. Forwarding path 122A includes routing table 142, feature list 144, first nexthop element 146, service table 150, second nexthop element 154A, core table 158, and queues 162. First nexthop element 146 includes service unit steering logic 148 and second nexthop element 154A includes CPU core steering logic 156A. Control plane 81 may, in some cases, output instructions to configure routing table 142, feature list 144, first nexthop element 146, and second nexthop element 154A. In the example of FIG. 3A, forwarding path 122A may route packets to service unit 126A for processing, but this is not required. Forwarding path 122A may route packets to any one or more of service units 126 of FIG. 2.

Routing table 142 represents a forwarding path element of the set of forwarding path elements of forwarding path 122A. Routing table 142 is a data table which contains a list of routes to a set of packet destinations within a network, such as network system 2. In some examples, when a packet (e.g., packet 196) arrives at forwarding path 122A, routing table 142 may select one or more routes of the list of routes based on a packet header of packet 196. For example, the packet header of packet 196 may include data indicative of a destination device which packet 196 is bound for, a device in which packet 196 originates at, one or more other devices in which packet 196 has been to or is bound for, or any combination thereof. Forwarding unit 112 of FIG. 2 may, in some cases, process the packet header of packet 196 in order to obtain the information included in the packet header. Routing table 142 may select the one or more routes of the list of routes based on the information included by the packet header. Subsequently, a logic of forwarding path 122A proceeds to feature list 144. Feature list 144 may represent a routing table nexthop (RTNH) feature list that is associated with packets which have a set of certain identifiers in their respective packet headers. For example, packet 196 may include a link identification code, a core identification code, and a tunnel identification (Tid) code. In this example, packet processor 120 may advance the logic of forwarding path 112A from routing table 142 to feature list 144, which is associated with the link identification code, the core identification code, and the Tid identification code.

As seen in FIG. 3A, the logic of forwarding path 122A proceeds to first nexthop element 146 from feature list 144. Packet processor 120 may execute first nexthop element 146 to map the packet flow to service unit 126A of service units 126 using service unit steering logic 148. In some examples, control plane 81 may generate first nexthop element 146 in order to steer packet 196 and other packets of the packet flow associated with packet 196 to a CPU core of a plurality of CPU cores. In this way, control plane 81 may generate first nexthop element 146 in order to map packet 196 to service unit 126A, which includes the CPU core of the plurality of CPU cores. Subsequently, the logic of forwarding path 122A proceeds to service table 150. The advance of forwarding path 122A from first nexthop element 146 to service table 150 may represent a mapping of packet 196 to service unit 126 of service units 126.

The logic of forwarding path 122A may subsequently proceed to second nexthop element 154A which includes CPU core steering logic 156A. Packet processor 120 may execute second nexthop element 154A, which includes CPU core steering logic 156A, to map packet 196 to CPU core 130B of CPU cores 130 which are located on service unit 126A. This mapping of packet 196 to CPU core 130B may be represented by an advance of forwarding path 122A from second nexthop element 154A to core table 158. In some examples, control plane 81 may generate second nexthop element 154A in order to map packets associated with the packet flow of packet 196 to the same CPU core. In the example of FIG. 3A, this CPU core is CPU core 130B. Since CPU core 130B is located on service unit 126A, control plane 81 may generate first nexthop element 146 and second nexthop element 154A to map packet 196 to CPU core 130B, allowing forwarding unit 112 to steer packet 196 to CPU core 130B for processing. In one or more other examples not illustrated in FIG. 3A, control plane 81 may generate a first nexthop element and a second nexthop element to map packet 196 to a CPU core located on another service unit, such as service unit 126N. In one or more such examples, control plane 81 may generate the respective first nexthop element to map packet 196 to service unit 126N and generate the respective second nexthop element to map packet 196 to the correct CPU core of a set of CPU cores located on service unit 126N.

Although first nexthop element 146, which corresponds to service unit 126A, is illustrated in FIG. 3A, forwarding path 122A may also include a respective nexthop element corresponding to each other service unit of service units 126 not illustrated in FIG. 3A. Additionally, although second nexthop element 154A, which corresponds to CPU core 130B, is illustrated in FIG. 3A, forwarding path 122A may also include a respective nexthop element corresponding to each other CPU core of CPU cores 130. In this way, it may be possible for control plane 81 to generate nexthop elements in order to map packet 196 or other packets to any CPU core located on any service unit of service plane 85.

The logic of forwarding path 122A proceeds to queues 162. Queue 164A may receive packet 196 from core table 158. In some examples, queues 164A-164N may represent queues that are each associated with a priority level. For example, queue 164A may correspond to a first priority level and queue 164B may correspond to a second priority level, where the first priority level is higher than the second priority level. As such, packet 196 may represent a "high priority" packet, which is forwarded by queues 162 before packets in queues 164B-164N that correspond to priority levels lower than the first priority level. Queue 164A may steer packet 196 to service unit 126A so that CPU core 130B may process packet 196 based on first nexthop element 146 and second nexthop element 154A mapping packet 196 to CPU core 130B of service unit 126A. In some examples, CPU core 130B may process packet 196 in order to administer services, such as one or more of network services 134.

Service unit 126A may steer packet 196A to routing table 166 after processing by CPU core 130B. Routing table 166 represents a forwarding path element of the set of forwarding path elements of forwarding path 122A. Routing table 166 is a data table which contains a list of routes to a set of packet destinations within a network, such as network system 2. Routing table 166 may perform a route lookup for packet 196, and routing table 166 may forward packet 196 via WAN interface 115. In some examples, WAN interface 115 may represent an IFC of IFCs 114 of FIG. 1.

Control plane 81 may generate first nexthop element 146 and second nexthop element 154A in order to map packet 196 to a CPU core or set of CPU cores which process all or nearly all packets associated with a service associated with packet 196. For example, if packet 196 is associated with an IPsec session, Control plane 81 may configure first nexthop element 146 and second nexthop element 154A in order to steer packet 196 to CPU core 130B, which processes all packets associated with the IPsec session associated with packet 196. In some cases, control plane 81 may configure first nexthop element 146 and second nexthop element 154A in order to route packets associated with another IPsec session different than the IPsec session associated with packet 196 to a CPU core other than CPU core 130B. In some cases, control plane 81 may configure first nexthop element 146 and second nexthop element 154A in order to route packets associated with another IPsec session different than the IPsec session associated with packet 196 to CPU core 130B. It may be more efficient for one CPU core to process packets associated with one service as compared with techniques in which more than one CPU core processes packets associated with one service.

The techniques of this disclosure are not meant to be limited to IPsec services. Control plane 81 may output instructions to configure first nexthop element 146 and second nexthop element 154A in order to steer packet 196 to a particular CPU core (e.g., CPU core 130B) of service unit 126B for processing based on packet 196 being associated with CG-NAT, media optimization (voice/video), VPN services, DPI services, HTTP filtering services, counting services, accounting services, charging services, load balancing services, or any combination thereof. For example, if packet 196 is associated with a VPN service, control plane 81 may output instructions to configure first nexthop element 146 and second nexthop element 154A in order to route packet 196 to CPU core 130B for processing with other packets associated with the VPN service.

Figure 3B:
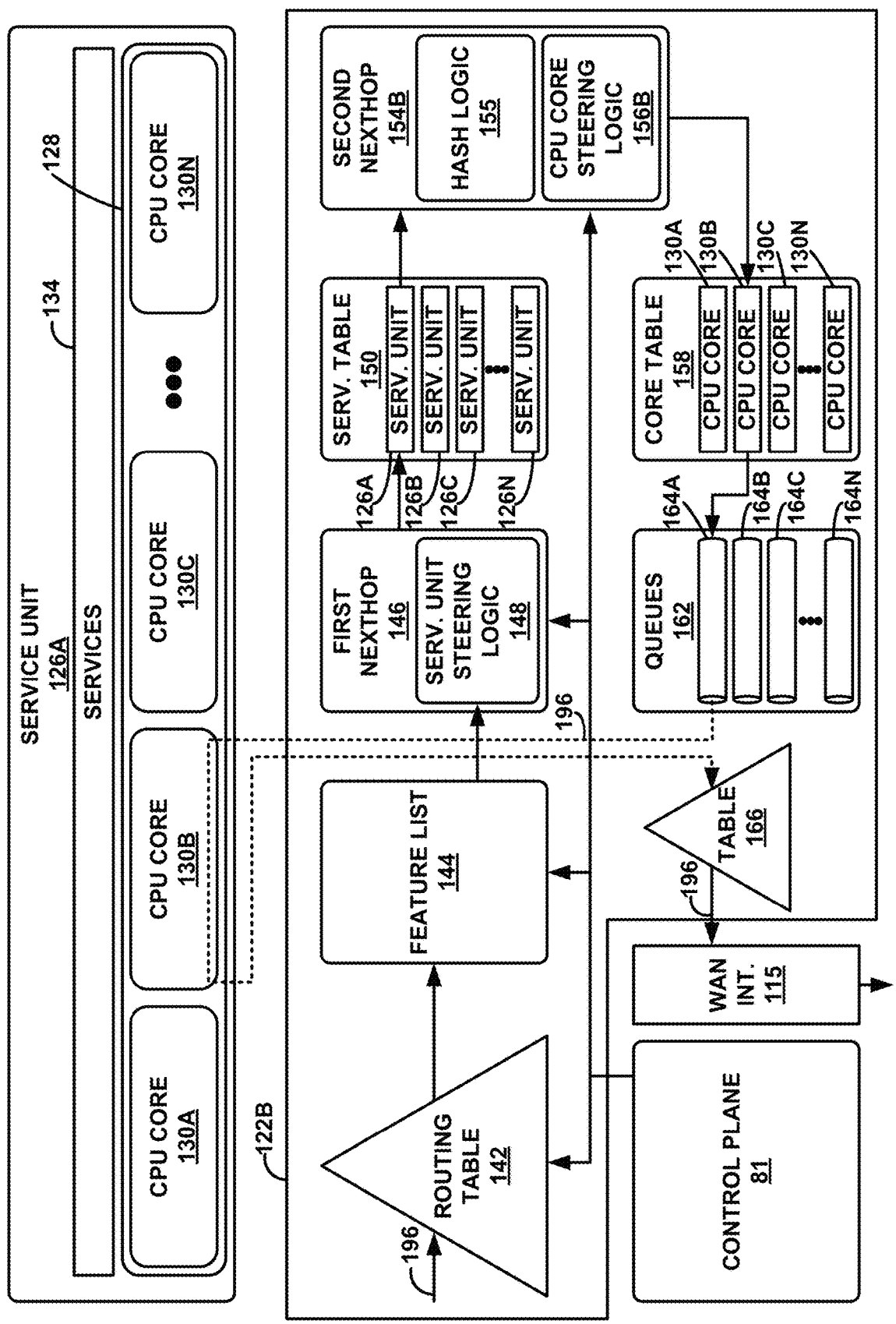
FIG. 3B is a conceptual diagram illustrating another example forwarding path, in accordance with one or more techniques of this disclosure.

FIG. 3B is a conceptual diagram illustrating another example forwarding path 122B, in accordance with one or more techniques of this disclosure. Forwarding path 122B may be an example of forwarding path 122 of FIG. 2. Forwarding path 122B includes routing table 142, feature list 144, first nexthop element 146, service table 150, second nexthop element 154B, core table 158, and queue 162. First nexthop element 146 includes service unit steering logic 148 and second nexthop element 154B includes hash logic 155 and CPU core steering logic 156A. Control plane 81 may, in some cases, output instructions to configure routing table 142, feature list 144, first nexthop element 146, and second nexthop element 154B. In the example of FIG. 3A, forwarding path 122B may route packets to service unit 126A for processing, but this is not required. Forwarding path 122B may route packets to any one or more of service units 126 of FIG. 2.

Forwarding path 122B may be substantially the same as forwarding path 122A of FIG. 3A, except that second nexthop element 154B of FIG. 3B includes hash logic 155 in addition to CPU core steering logic 156B, whereas second nexthop element 154A includes CPU core steering logic 156A and does not include a hash logic. In some examples, it may be beneficial for bi-directional traffic of each IPsec session of a set of IPsec sessions to be processed by a common CPU core. In some examples, control plane 81 may program forwarding path 122B based on a set of metadata and may forward network traffic to one or more CPU cores provisioned by control plane 81. For example, control plane 81 may program first nexthop element 146 and second nexthop 154 to steer packet 196 for processing by CPU core 130B of service unit 126A.

The term "session," "packet flow," "traffic flow," or simply "flow" refers to a set of packets originating from a particular source device or endpoint and sent to a particular destination device or endpoint. A single flow of packets may be identified by a 5-tuple hash: <source network address, destination network address, source port, destination port, protocol>, for example. This 5-tuple hash generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The 5-tuple hash of packet 196 may be located in the packet header of packet 196.

In the example of FIG. 3B, control plane 81 may program forwarding path 122B in order to steer packet 196 to a group of CPU cores located in service plane 85, such as two or more of CPU cores 130. Second nexthop 154B may select, based on a 5-tuple hash or a 7-tuple hash of packet 196, one of the two or more of CPU cores 130 in which to steer packet 196. In the example of FIG. 3A, on the other hand, control plane 81 may program forwarding path 122B to steer packet 196 to a particular CPU core, such as CPU core 130B.

In some examples, to steer packet 196 to CPU core 130B, packet processor 120 of forwarding unit 112 is configured to execute the second nexthop element 154B to select CPU core 130B from CPU cores 130 of a selected service unit 126B. In some examples, to select CPU core 130B from the set of CPU cores 130 of the selected service unit 126A, packet processor 120 of forwarding unit 112 is configured to execute second nexthop element 154B to apply, using hash logic 155, a hash function to one or more elements of a packet header of packet 196 to generate a hash index that maps to CPU core 130B. In this way, second nexthop element 154B may map packet 196 to CPU core 130B for processing on the 5-tuple hash of packet 196.

Figure 4:
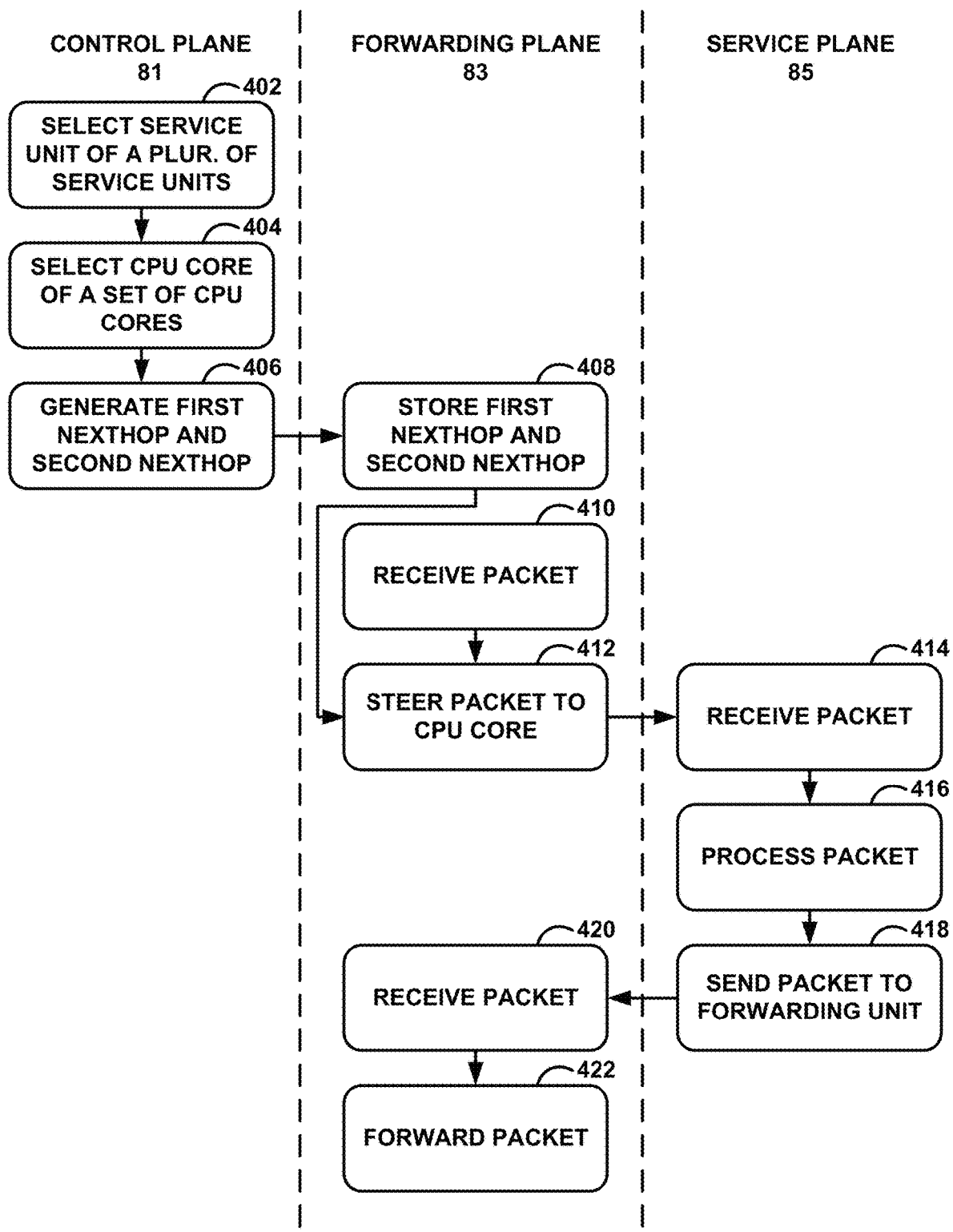
FIG. 4 is a flow diagram illustrating an example operation for steering a packet to a service plane for processing, in accordance with one or more techniques of this disclosure.

FIG. 4 is a flow diagram illustrating an example operation for steering a packet to a service plane 85 for processing, in accordance with one or more techniques of this disclosure. FIG. 4 is described with respect to control plane 81, forwarding plane 83, and service plane 85 of network device 80 of FIG. 2. However, the techniques of FIG. 4 may be performed by different components of network device 80 or by additional or alternative devices.

In some examples, control unit 82 of FIG. 2 includes processing circuitry 102 in communication with a memory, where the processing circuitry is configured to execute one or more processes. The one or more processes may, in some cases, include VMs 90. Forwarding unit 112 of FIG. 2 includes IFCs 114, packet processor 120, and a forwarding unit memory. In some examples, the one or more processes of control unit 82 are configured for execution by processing circuitry 102 in order to configure the forwarding unit memory of forwarding unit 112 with one or more forwarding path elements 124. The one or more forwarding path elements 124 may map a packet flow to a CPU core of a plurality of CPU cores located in service plane 85. After the one or more processes of control unit 82 configure the forwarding unit memory with one or more forwarding path elements 124, forwarding unit 112 may receive, via one of IFCs 114, a packet. Additionally, packet processor 120 of forwarding unit 112 is configured to execute the one or more forwarding path elements 124 in the forwarding unit memory to steer the packet to the CPU core of the plurality of CPU cores located in service plane 85.

As seen in FIG. 4, the one or more processes of control unit 82 may select a service unit of a plurality of service units 126 (402) located in service plane 85. In some examples, control unit 82 may select service unit 126A with which to process the packet flow which forwarding path elements 124 map to the CPU core of the plurality of CPU cores, where service unit 126A includes the CPU core. The one or more processes of control unit 82 may select, from a set of CPU cores 130 of the selected service unit 126A, CPU core 130B (404). The one or more processes may generate a first nexthop element and a second nexthop element (406). In some examples, the first nexthop element map the packet flow to the selected service unit 126A and the second nexthop element may map the packet flow to the selected CPU core 130B of CPU cores 130 of the selected service unit 126A.

In some examples, to generate the first nexthop element and generate the second nexthop element, the one or more processes of control unit 82 are configured to identify, based on a packet header of a packet arriving at forwarding unit 112, a service associated with the packet, and generate, based on the service, the first nexthop element and the second nexthop element. Additionally, or alternatively, the one or more processes may associate each service of a plurality of services with one or more CPU cores of the plurality of CPU cores located in service units 126 of service plane 85. In some examples, the plurality of services may include network services 134 of service unit 126A and one or more other services executing on service units 126B-126N. The one or more processes of control unit 82 may generate, based on the one or more CPU cores associated with each service of the plurality of services, the first nexthop element and the second nexthop element. In some examples, the one or more processes may generate the first nexthop element and the second nexthop element in order to balance a processing load across the plurality of CPU cores located on service units 126 of service plane 85. In some cases, the one or more processes may generate forwarding path elements in addition to the first nexthop element and the second nexthop element.

Forwarding unit 112 may store the first nexthop element and the second nexthop element (408) generated by the one or more processes of control unit 82. Forwarding unit 112 may receive, via one of IFCs 114, a packet (410) of the packet flow which forwarding path elements 124 steer to the CPU core of the plurality of CPU cores located on service units 126 of service plane 85. Subsequently, packet processor 120 of forwarding unit 112 may execute forwarding path elements 124 in order to steer the packet to the CPU core (412) of the plurality of CPU cores. For example, to steer the packet to the CPU core, packet processor 120 may be configured to execute the first nexthop element to map the packet flow to the selected service unit 126A and packet processor 120 may be configured to execute the second nexthop element to map the packet flow to the selected CPU core 130B of the set of CPU cores 130 located on the selected service unit 126A. Additionally, or alternatively, to steer the packet to CPU core 130B, packet processor 120 of forwarding unit 112 is configured to execute the second nexthop element to select CPU core 130B from CPU cores 130 of the selected service unit 126A. In some examples, to select CPU core 130B from CPU cores 130 of the selected service unit 126A, packet processor 120 of forwarding unit 112 is configured to execute the second nexthop element to apply a hash function to one or more elements of a packet header of the packet to generate a hash index that maps to CPU core 130B from the CPU cores 130 of the selected service unit 126A.

The selected service unit 126A may receive the packet 414 (414). Subsequently, CPU core 130B may process the packet (416) in order to apply a service of services 134 to the packet. For example, the packet flow of the packet may correspond to an IPsec session. And CPU core 130B may process the packet in order to encrypt or decrypt data in the payload of the packet, but this is not required. CPU core 130B may process the packet in order to apply any respective one of services 134 that is associated with the packet flow. Service unit 126A may send the packet to forwarding unit 112 (418) and forwarding unit 112 may receive the packet (420). Forwarding unit 112 may forward the packet (422) via one of IFCs 114.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network device comprising:
   a control unit comprising processing circuitry in communication with a memory, wherein the processing circuitry is configured to execute one or more processes; and
   a forwarding unit comprising an interface card, a packet processor, and a forwarding unit memory,
   wherein the one or more processes of the control unit are configured to configure the forwarding unit memory of the forwarding unit with one or more forwarding path elements,
   wherein the one or more forwarding path elements map a packet flow to a central processing unit (CPU) core of a plurality of CPU cores for processing,
   wherein the forwarding unit is configured to receive, via the interface card, a packet of the packet flow,
   wherein the forwarding unit further comprises respective output queues for the plurality of CPU cores, and
   wherein the packet processor of the forwarding unit is configured to execute the one or more forwarding path elements in the forwarding unit memory to steer the packet to the CPU core by adding the packet to the output queue for the CPU core.

2. The network device of claim 1, wherein the one or more forwarding path elements comprise a first nexthop element, and wherein the one or more processes are further configured to:
   select a service unit of a plurality of service units with which to process the packet flow, where the service unit comprises the CPU core; and
   generate the first nexthop element to map the packet flow to the selected service unit, and
   wherein, to steer the packet to the CPU core, the packet processor of the forwarding unit is further configured to execute the first nexthop element to map the packet flow to the selected service unit.

3. The network device of claim 2, wherein the one or more forwarding path elements comprise a second nexthop element, wherein the selected service unit comprises the plurality of CPU cores, wherein the one or more processes are further configured to:
   select, from the plurality of CPU cores of the selected service unit, the CPU core; and
   generate the second nexthop element to map the packet flow to the CPU core of plurality of CPU cores of the selected service unit, and
   wherein, to steer the packet to the CPU core, the packet processor of the forwarding unit is further configured to execute the second nexthop element to map the packet flow to the CPU core.

4. The network device of claim 2,
   wherein the one or more forwarding path elements comprise a second nexthop element,
   wherein the selected service unit comprises the plurality of CPU cores, and
   wherein, to steer the packet to the CPU core, the packet processor of the forwarding unit is further configured to execute the second nexthop element to select the CPU core from the plurality of CPU cores of the selected service unit.

5. The network device of claim 4, wherein, to select the CPU core from the plurality of CPU cores of the selected service unit, the packet processor of the forwarding unit is configured to execute the second nexthop element to apply a hash function to one or more elements of a packet header of the packet to generate a hash index that maps to the CPU core from the plurality of CPU cores of the selected service unit.

6. The network device of claim 2, wherein the selected service unit is a first service unit, wherein the one or more processes are further configured to:
  select a second service unit as a replacement of the first service unit; and
  in response to detecting a failure of the first service unit, reconfigure the first nexthop element to map the packet flow to the second service unit.

7. The network device of claim 1, wherein the one or more processes are further configured to:
  identify, based on a packet header of the packet, a service associated with the packet, and
  generate, based on the service, the one or more forwarding path elements.

8. The network device of claim 7, wherein the one or more processes are further configured to:
  associate each service of a plurality of services with one or more CPU cores of the plurality of CPU cores; and
  generate, based on the one or more CPU cores of the plurality of CPU cores associated with each service of the plurality of services, the one or more forwarding path elements.

9. The network device of claim 7, wherein the one or more processes are further configured to:
  associate each service of a plurality of services with one or more CPU cores of the plurality of CPU cores; and
  generate, based on the one or more CPU cores of the plurality of CPU cores associated with each service of the plurality of services, the one or more forwarding path elements in order to balance a processing load across the plurality of CPU cores.

10. The network device of claim 1, wherein the packet flow corresponds to an Internet Protocol Security (IPsec) session.

11. A method comprising:
  executing, by processing circuitry of a control unit, one or more processes, wherein the processing circuitry is in communication with a memory;
  configuring, by the one or more processes of the control unit, a forwarding unit memory of a forwarding unit with one or more forwarding path elements,
  wherein the forwarding unit comprises an interface card, a packet processor, and the forwarding unit memory,
  wherein the one or more forwarding path elements map a packet flow to a central processing unit (CPU) core of a plurality of CPU cores for processing, and
  wherein the forwarding unit further comprises respective output queues for the plurality of CPU cores;
  receiving, by the forwarding unit via the interface card, a packet of the packet flow; and
  executing, by the packet processor, the one or more forwarding path elements in the forwarding unit memory to steer the packet to the CPU core by adding the packet to the output queue for the CPU core.

12. The method of claim 11, wherein the one or more forwarding path elements comprise a first nexthop element, and wherein the method further comprises:
  selecting, by the one or more processes, a service unit of a plurality of service units with which to process the packet flow, where the service unit comprises the CPU core; and
  generating, by the one or more processes, the first nexthop element to map the packet flow to the selected service unit,
  wherein executing the one or more forwarding path elements in the forwarding unit memory to steer the packet to the CPU core further comprises executing the first nexthop element to map the packet flow to the selected service unit.

13. The method of claim 12, wherein the one or more forwarding path elements comprise a second nexthop element, wherein the selected service unit comprises the plurality of CPU cores, and wherein the method further comprises:
  selecting, by the one or more processes from the plurality of CPU cores of the selected service unit, the CPU core;
  generating, by the one or more processes the second nexthop element to map the packet flow to the CPU core of plurality of CPU cores of the selected service unit, and
  wherein steering the packet to the CPU core further comprises executing, by the packet processor, the second nexthop element to map the packet flow to the CPU core.

14. The method of claim 12,
  wherein the one or more forwarding path elements comprise a second nexthop element,
  wherein the selected service unit comprises the plurality of CPU cores, and
  wherein steering the packet to the CPU core further comprises executing, by the packet processor, the second nexthop element to select the CPU core from the plurality of CPU cores of the selected service unit.

15. The method of claim 14, wherein selecting the CPU core from the plurality of CPU cores of the selected service unit comprises executing, by the packet processor, the second nexthop element to apply a hash function to one or more elements of a packet header of the packet to generate a hash index that maps to the CPU core from the plurality of CPU cores of the selected service unit.

16. The method of claim 12, wherein the selected service unit is a first service unit, wherein the method further comprises:
  selecting, by the one or more processes, a second service unit as a replacement of the first service unit; and
  in response to detecting a failure of the first service unit, reconfiguring, by the one or more processes, the first nexthop element to map the packet flow to the second service unit.

17. The method of claim 11, wherein the method further comprises:
  identifying, by the one or more processes based on a packet header of the packet, a service associated with the packet; and
  generating, by the one or more processes based on the service, the one or more forwarding path elements.

18. The method of claim 17, wherein the method further comprises:
  associating, by the one or more processes, each service of a plurality of services with one or more CPU cores of the plurality of CPU cores; and
  generating, by the one or more processes based on the one or more CPU cores of the plurality of CPU cores associated with each service of the plurality of services, the one or more forwarding path elements.

19. A non-transitory computer-readable medium comprising instructions for causing one or more programmable processors of a network device to:
  execute one or more processes of a control plane;
  configure a forwarding unit memory of a forwarding unit with one or more forwarding path elements, wherein the forwarding unit comprises an interface card, a packet processor, and the forwarding unit memory, wherein the forwarding path elements map a packet flow to a central processing unit (CPU) core of a plurality of CPU cores, and wherein the forwarding unit further comprises respective output queues for the plurality of CPU cores;

receive a packet of the packet flow; and execute the one or more forwarding path elements in the forwarding unit memory to steer the packet to the CPU core for processing by the CPU core by adding the packet to the output queue for the CPU core.

20. A network device comprising:

a control unit comprising processing circuitry in communication with a memory, wherein the processing circuitry is configured to execute one or more processes; and a forwarding unit comprising an interface card, a packet processor, and a forwarding unit memory, wherein the one or more processes of the control unit are configured to configure the forwarding unit memory of the forwarding unit with one or more forwarding path elements, wherein the one or more forwarding path elements map a packet flow to a central processing unit (CPU) core of a plurality of CPU cores for processing, wherein the packet flow corresponds to an Internet Protocol Security (IPsec) session, wherein the forwarding unit is configured to receive, via the interface card, a packet of the packet flow, and wherein the packet processor of the forwarding unit is configured to execute the one or more forwarding path elements in the forwarding unit memory to steer the packet to the CPU core.

* * * * *